United States Patent
Gao et al.

(10) Patent No.: US 11,330,611 B2
(45) Date of Patent: May 10, 2022

(54) METHOD AND DEVICE FOR UPLINK TRANSMISSION

(71) Applicant: CHINA ACADEMY OF TELECOMMUNICATIONS TECHNOLOGY, Beijing (CN)

(72) Inventors: Xuejuan Gao, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 127 days.

(21) Appl. No.: 16/090,169

(22) PCT Filed: Mar. 20, 2017

(86) PCT No.: PCT/CN2017/077298
§ 371 (c)(1),
(2) Date: Sep. 28, 2018

(87) PCT Pub. No.: WO2017/167053
PCT Pub. Date: Oct. 5, 2017

(65) Prior Publication Data
US 2019/0124675 A1    Apr. 25, 2019

(30) Foreign Application Priority Data
Mar. 31, 2016 (CN) .......................... 201610197214.1

(51) Int. Cl.
*H04W 72/12* (2009.01)
*H04L 5/00* (2006.01)
*H04W 72/04* (2009.01)

(52) U.S. Cl.
CPC ....... *H04W 72/1268* (2013.01); *H04L 5/0044* (2013.01); *H04L 5/0048* (2013.01);
(Continued)

(58) Field of Classification Search
CPC ............ H04W 72/1268; H04W 72/04; H04W 72/1289; H04W 72/042; H04W 72/14;
(Continued)

(56) References Cited

U.S. PATENT DOCUMENTS

2007/0160118 A1   7/2007  Charbit
2009/0213723 A1   8/2009  Noh et al.
(Continued)

FOREIGN PATENT DOCUMENTS

CN       1866786 A    11/2006
CN     101414870 A     4/2009
(Continued)

OTHER PUBLICATIONS

3GPP TS 36.211 version 10.1.0 Release 10 (Year: 2011).*
(Continued)

*Primary Examiner* — Justin T Van Roie
(74) *Attorney, Agent, or Firm* — Ladas & Parry, LLP

(57) ABSTRACT

An uplink transmission method and an uplink transmission device are provided. The uplink transmission method includes: receiving a first downlink control channel which carries scheduling information of a first uplink shared channel and determining, based on the scheduling information carried on the first downlink control channel, a first frequency domain resource for transmitting the first uplink shared channel; generating a pilot of the first uplink shared channel based on the first frequency domain resource and a basic frequency domain unit; and transmitting the first uplink shared channel and the pilot on the first frequency domain resource.

20 Claims, 4 Drawing Sheets

(52) U.S. Cl.
CPC .......... *H04L 5/0053* (2013.01); *H04L 5/0094* (2013.01); *H04W 72/04* (2013.01); *H04W 72/1289* (2013.01); *H04L 5/0007* (2013.01)

(58) Field of Classification Search
CPC ... H04L 5/0053; H04L 5/0044; H04L 5/0094; H04L 5/0048; H04L 5/0007
See application file for complete search history.

(56) References Cited

U.S. PATENT DOCUMENTS

| | | | |
|---|---|---|---|
| 2011/0128909 A1* | 6/2011 | Luo | H04L 5/0023 370/328 |
| 2011/0243080 A1 | 10/2011 | Chen et al. | |
| 2012/0140717 A1 | 6/2012 | Zhu et al. | |
| 2012/0147837 A1 | 6/2012 | Shimomura et al. | |
| 2012/0250656 A1 | 10/2012 | Noh et al. | |
| 2015/0249980 A1 | 9/2015 | You et al. | |
| 2015/0257173 A1 | 9/2015 | You et al. | |

FOREIGN PATENT DOCUMENTS

| | | |
|---|---|---|
| CN | 101645868 A | 2/2010 |
| CN | 101953129 A | 1/2011 |
| CN | 102158252 A | 8/2011 |
| CN | 102404854 A | 4/2012 |
| CN | 102598530 A | 7/2012 |
| CN | 103517345 A | 1/2014 |
| CN | 103944665 A | 7/2014 |
| CN | 105898872 A | 8/2016 |
| CN | 102685890 | 9/2019 |
| WO | 2015154505 A1 | 10/2015 |

OTHER PUBLICATIONS

Rui et al., "Carrier Aggregation for LTE-Advanced: Uplink Multiple Access and Transmission Enhancement Features", IEEE Wireless Communications, Aug. 2013 (Year: 2013).*
First Office Action and search report from CN App. No. 201610197214. 1, dated Nov. 2, 2018, with English translation from Global Dossier.
Extended European Search Report from EP App. No. 17773083.5, dated Feb. 11, 2019.
First Office Action and search report from TW App. No. 106109862, dated Nov. 21, 2017, with machine English translation.
Second Office Action and Search Report from CN app. No. 201610197214.1, dated Jul. 16, 2019, with English translation from Global Dossier.
"Discussion on PUSCH transmission with TTI shortening", R1-160655, 3GPP TSG RAN WG1 Meeting #84, St. Julian's, Malta, Feb. 15-19, 2016.
International Search Report for PCT/CN2017/077298 dated Jun. 6, 2017 and its English translation provided by WIPO.
Written Opinion of the International Search Authority PCT/CN2017/077298 dated Jun. 6, 2017 and its English translation provided by WIPO.
International Preliminary Report on Patentability for PCT/CN2017/077298 dated Oct. 2, 2018.
The First Office Action and Search Report dated Jun. 1, 2017 in CN application 201310020112.9 (CN 103944665 A) with translation from Global Dossier.
The Second Office Action dated Nov. 3, 2017 in CN application 201310020112.9 (CN 103944665 A) with translation from Global Dossier.
Written Opinion of the International Search Authority PCT/CN2017/077298 dated Jun. 6, 2017 and its English translation provided by Google Translate.

* cited by examiner

METHOD AND DEVICE FOR UPLINK TRANSMISSION

CROSS-REFERENCE TO RELATED APPLICATIONS

This application is the U.S. national phase of PCT Application PCT/CN2017/077298 filed on Mar. 20, 2017, which claims a priority to Chinese Patent Application No. 201610197214.1 filed on Mar. 31, 2016, the disclosures of which are incorporated in their entireties by reference herein.

TECHNICAL FIELD

The present disclosure relates to the technical field of telecommunication, in particular to an uplink transmission method and an uplink transmission device.

BACKGROUND

Frame structure type 1 (FS1) is utilized in an LTE frequency division duplexing (FDD) system in relevant technology. The structure of FS1 is shown in FIG. 1. In the FDD system, different carrier frequencies and an identical frame structure are utilized in uplink transmission and downlink transmission. One 10 ms wireless frame on each carrier includes 10 1 ms subframe. Each subframe includes 2 0.5 ms time slots. A transmission time interval (TTI) for transmitting uplink data and downlink data is 1 ms.

Frame structure type 2 (FS2) is utilized in an LTE time division duplexing (TDD) system in relevant technology. The structure of FS2 is shown in FIG. 2. In the TDD system, uplink transmission and downlink transmission utilized different subframes or different time slots on an identical frequency. In FS2, each 10 ms wireless frame includes two 5 ms half-frame and each half-frame includes 5 1 ms subframes. There are three types of subframes in FS2: downlink subframe, uplink subframe and special subframe. Each special subframe includes three parts of a downlink pilot time slot (DwPTS), a guard period (GP) and an uplink pilot time slot (UpPTS). A downlink pilot, downlink service data and a downlink control signaling can be transmitted in DwPTS, no signal is transmitted in GP, and only a random access and a sounding reference symbol (SRS) are transmitted in UpPTS while an uplink service or uplink control information cannot be transmitted in UpPTS. Each haft-frame includes at least one downlink subframe, at least one uplink subframe and at most one special subframe. Seven ways of uplink and downlink subframe configuration executed in FS2 are shown in Form 1:

Form 1

| Uplink-downlink configu-ration | Period of switching points between downlink and uplink | subframe ID | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Structures of data and pilots (i.e., reference signals, or DMRS, which are used to demodulate data) on an LTE physical uplink shared control channel (PUSCH) in one subframe are shown in FIG. 3a and FIG. 3b. In case of normal cyclic prefix (CP), a fourth symbol in each time slot of each subframe is used to transmit a pilot and other symbols are used to transmit data. In case of extended CP, a third symbol in each time slot of each subframe is used to transmit a pilot and other symbols are used to transmit data. An uplink pilot is a terminal-specific pilot and is generated based on a size of an actual bandwidth scheduled by the PUSCH. To support uplink multi-user multiple-input multiple-output (MU-MIMO), each column of pilots can be achieved by performing cyclic shift on an identical pilot base sequence, thereby achieving orthogonal transmissions of pilots of multiple terminals sharing an identical resource, such that a receiving end can distinguish information about pilots of different terminals through cyclic shift.

In an LTE system, channel transmission in relevant technology is defined in unit of subframe and is not associated with a transmission structure shorter than 1 ms.

As mobile telecommunication service requirements develop and change, several organizations such as the international telecommunication union (ITU) define higher requirements on user plane delay performance of future mobile telecommunication system. An approach of shortening user delay is to reduce a length of TTI. There is no specific method for data transmission in case of shortened transmission TTI.

SUMMARY

The present disclosure intends to provide an uplink transmission method and an uplink transmission device, which can solve the problem in relevant technology that there is no specific approach for data transmission in case of shortened TTI and transmitted data may not be demodulated correctly.

In view of the technical problem, the present disclosure provides an uplink transmission method, including: receiving a first downlink control channel which carries scheduling information of a first uplink shared channel and determining, based on the scheduling information carried on the first downlink control channel, a first frequency domain resource for transmitting the first uplink shared channel; generating a pilot of the first uplink shared channel based on the first frequency domain resource and a basic frequency domain unit; and transmitting the first uplink shared channel and the pilot on the first frequency domain resource.

Optionally, the basic frequency domain unit includes M resource blocks/sub-carriers/resource units in a systematic uplink transmission bandwidth, M is a predefined or pre-configured positive integer that is larger than or equal to 1, the resource unit includes one predefined sub-carrier on one symbol or X2 continuous sub-carriers on one symbol, and X2 is a positive integer larger than 0.

Optionally, the M resource blocks/sub-carriers/resource units are continuous or discontinuous in frequency domain.

Optionally, the processes of generating the pilot of the first uplink shared channel based on the first frequency domain resource and the basic frequency domain unit and transmitting the pilot on the first frequency domain resource include: generating a basic pilot for each basic frequency domain unit in the first frequency domain resource independently according to a pilot length corresponding to the each basic frequency domain unit, performing a cyclic shift on the basic pilot corresponding to the each basic frequency domain unit in the first frequency domain resource to obtain a pilot corresponding to the each basic frequency domain unit in the first frequency domain resource, and mapping the pilot to the each basic frequency domain unit in the first frequency domain resource for transmission; or generating a basic pilot according to a pilot length corresponding to the basic frequency domain unit, performing a cyclic shift on the basic pilot, and mapping a result after the cyclic shift to each basic frequency domain unit in the first frequency domain resource for transmission. In a case that the first frequency domain resource includes multiple basic frequency domain units, pilot lengths corresponding to the multiple basic frequency domain units are identical, cyclic shift values corresponding to the multiple basic frequency domain units are identical or different.

Optionally, a size of the first frequency domain resource is an integral multiple of the basic frequency domain unit.

Optionally, the basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Optionally, the process of generating the basic pilot according to the pilot length corresponding to the basic frequency domain unit includes: generating the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

The present disclosure further provides an uplink transmission device, comprising: a first processing module, configured to receive a first downlink control channel which carries scheduling information of a first uplink shared channel and determine, based on the scheduling information carried on the first downlink control channel, a first frequency domain resource for transmitting the first uplink shared channel; and a second processing module, configured to generate a pilot of the first uplink shared channel based on the first frequency domain resource and a basic frequency domain unit and transmit the first uplink shared channel and the pilot on the first frequency domain resource.

Optionally, the basic frequency domain unit includes M resource blocks/sub-carriers/resource units in a systematic uplink transmission bandwidth, M is a predefined or pre-configured positive integer that is larger than or equal to 1, the resource unit includes one predefined sub-carrier on one symbol or X2 continuous sub-carriers on one symbol, and X2 is a positive integer larger than 0.

Optionally, the M resource blocks/sub-carriers/resource units are continuous or discontinuous in frequency domain.

Optionally, the second processing module includes: a first processing sub-module configured to generate a basic pilot for each basic frequency domain unit in the first frequency domain resource independently according to a pilot length corresponding to the each basic frequency domain unit, perform a cyclic shift on the basic pilot corresponding to the each basic frequency domain unit in the first frequency domain resource to obtain a pilot corresponding to the each basic frequency domain unit in the first frequency domain resource, and map the pilot to the each basic frequency domain unit in the first frequency domain resource for transmission; or a second processing sub-module configured to generate a basic pilot according to a pilot length corresponding to the basic frequency domain unit, perform a cyclic shift on the basic pilot, and map a result after the cyclic shift to each basic frequency domain unit in the first frequency domain resource for transmission. In a case that the first frequency domain resource includes multiple basic frequency domain units, pilot lengths corresponding to the multiple basic frequency domain units are identical, cyclic shift values corresponding to the multiple basic frequency domain units are identical or different.

Optionally, a size of the first frequency domain resource is an integral multiple of the basic frequency domain unit.

Optionally, the basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Optionally, both the first processing sub-module and the second processing sub-module include a first generating unit, configured to generate the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

The present disclosure further provides an uplink transmission method, including: determining a first frequency domain resource that is used by a terminal to transmit a first uplink shared channel and transmitting a first downlink control channel to the terminal, wherein the first downlink control channel is used to carry scheduling information of the first uplink shared channel and the scheduling information comprises the first frequency domain resource; and receiving, on the first frequency domain resource, the first uplink shared channel and a pilot for the first uplink shared channel that are transmitted by the terminal, wherein the pilot is generated based on the first frequency domain resource and a basic frequency domain unit.

Optionally, the basic frequency domain unit includes M resource blocks/sub-carriers/resource units in a systematic uplink transmission bandwidth, M is a predefined of pre-configured positive integer that is larger, than or equal to 1, the resource unit includes one predefined sub-carrier on one symbol or X2 continuous sub-carriers on one symbol, and X2 is a positive integer larger than 0.

Optionally, the M resource blocks/sub-carriers/resource units are continuous or discontinuous in frequency domain.

Optionally, a process of generating the pilot based on the first frequency domain resource and the basic frequency domain unit comprises determining that the terminal generates the pilot by: generating a basic pilot for each basic frequency domain unit in the first frequency domain resource independently according to a pilot length corresponding to the each basic frequency domain unit and performing a cyclic shift on the basic pilot corresponding to the each basic frequency domain unit in the first frequency domain resource to obtain a pilot corresponding to the each basic frequency domain unit in the first frequency domain resource; or generating a basic pilot according to a pilot length corresponding to the basic frequency domain unit and performing a cyclic shift on the basic pilot to obtain a pilot corresponding to each basic frequency domain unit in the first frequency domain resource. In a case that the first frequency domain resource includes multiple basic frequency domain units, pilot lengths corresponding to the multiple basic frequency domain units are identical, cyclic shift values corresponding to the multiple basic frequency domain units are identical or different.

Optionally, a size of the first frequency domain resource is an integral multiple of the basic frequency domain unit.

Optionally, the basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Optionally, the process of generating the basic pilot according to the pilot length corresponding to the basic frequency domain unit includes: generating the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

The present disclosure further provides an uplink transmission device, including: a third processing module, configured to determine a first frequency domain resource that is used by a terminal to transmit a first uplink shared channel and transmit a first downlink control channel to the terminal, wherein the first downlink control channel is used to carry scheduling information of the first uplink shared channel and the scheduling information includes the first frequency domain resource; and a first receiving module, configured to receive, on the first frequency domain resource, the first uplink shared channel and a pilot for the first uplink shared channel that are transmitted by the terminal, wherein the pilot is generated based on the first frequency domain resource and a basic frequency domain unit.

Optionally, the basic frequency domain unit includes M resource blocks/sub-carriers/resource units in a systematic uplink transmission bandwidth, M is a predefined or preconfigured positive integer that is larger than or equal to 1, the resource unit is one predefined sub-carrier on one symbol or X2 continuous sub-carriers on one symbol, and X2 is a positive integer larger than 0.

Optionally, the M resource blocks/sub-carriers/resource units are continuous or discontinuous in frequency domain.

Optionally, the pilot is generated based on the first frequency domain resource and the basic frequency domain unit and the uplink transmission device comprises a first determining module, configured to determine that the terminal generates the pilot by: generating a basic pilot for each basic frequency domain unit in the first frequency domain resource independently according to a pilot length corresponding to the each basic frequency domain unit and performing a cyclic shift on the basic pilot corresponding to the each basic frequency domain unit in the first frequency domain resource to obtain a pilot corresponding to the each basic frequency domain unit in the first frequency domain resource; or generating a basic pilot according to a pilot length corresponding to the basic frequency domain unit and performing a cyclic shift on the basic pilot to obtain a pilot corresponding to each basic frequency domain unit in the first frequency domain resource. In a case that the first frequency domain resource includes multiple basic frequency domain units, pilot lengths corresponding to the multiple basic frequency domain units are identical, cyclic shift values corresponding to the multiple basic frequency domain units are identical or different.

Optionally, a size of the first frequency domain resource is an integral multiple of the basic frequency domain unit.

Optionally, the basic pilots corresponding to multiple first uplink shared channels sharing an identical symbol position for pilot transmission are identical, and/or, multiple first uplink shared channels simultaneously transmitting pilots on an identical basic frequency domain unit have the same basic pilot on the basic frequency domain unit and different cyclic shift values.

Optionally, the process of generating the basic pilot according to the pilot length corresponding to the basic frequency domain unit includes; generating the basic pilot corresponding to the basic frequency domain unit using one or any combination of a Gold sequence, a pseudorandom sequence and an m sequence.

Optionally, the cyclic shift value is determined according, to a preset rule, or according to an indication of a high layer signaling, or according to an indication field in the first downlink control channel.

The present disclosure further provides a base station, including a processor, a transceiver and a storage; wherein the processor is configured to read a program stored in the storage to perform the following processes: receiving a first downlink control channel which carries scheduling information of a first uplink shared channel and determining, based on the scheduling information carried on the first downlink control channel, a first frequency domain resource for transmitting the first uplink shared channel; generating a pilot of the first uplink shared channel based on the first frequency domain resource and a basic frequency domain unit; and transmitting the first uplink shared channel and the pilot on the first frequency domain resource. The transceiver is configured to receive and transmit data. The storage is configured to store data used by the processor in operation.

The present disclosure further provides a base station, including a processor, a transceiver and a storage; wherein the processor is configured to read a program stored in the storage to perform the following processes: determining a first frequency domain resource that is used by a terminal to transmit a first uplink shared channel and transmitting a first downlink control channel to the terminal, wherein the first downlink control channel is used to carry scheduling information of the first uplink shared channel and the scheduling information comprises the first frequency domain resource; and receiving, on the first frequency domain resource, the first uplink shared channel and a pilot for the first uplink shared channel that are transmitted by the terminal, wherein the pilot is generated based on the first frequency domain resource and a basic frequency domain unit. The transceiver is configured to receive and transmit data. The storage is configured to store data used by the processor in operation.

Beneficial effects of the technical solution of the present disclosure are described as follows. In the technical solution, in the uplink transmission method, DMRSs are generated segmentally on the scheduled frequency domain resource based on the basic frequency domain units. In this way, in each basic frequency domain unit, DMRSs of different uplink (UL) TTIs are orthogonal, and it is ensured that uplink data can be correctly transmitted and demodulated.

DETAILED DESCRIPTION

The present disclosure is detailed in conjunction with drawings and specific embodiments to better clarify technical problems to be solved, technical solutions and advantages.

Considering that there is no transmission structure shorter than 1 ms in relevant art and shortened TTI still needs to be transmitted on 1 ms transmission structure and further considering actual transmission conditions, the following concept is proposed.

In case of transmitting PUSCH using a TTI length shorter than 1 ms, a DMRS structure designed for 1 ms subframe in LTE system is stilled utilized, that is, a defined position of a DMRS transmission symbol in one subframe in LTE system is not changed and multiple PUSCHs transmitted using a TTI length shorter than 1 ms in an identical subframe can share the position of the DMRS symbol in the LTE system.

Figure 1:
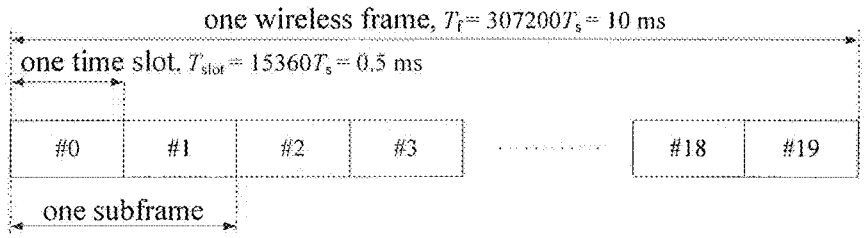
FIG. 1 is a schematic structural diagram of frame structure type 1 utilized in an FDD system in relevant technology.
Figure 2:
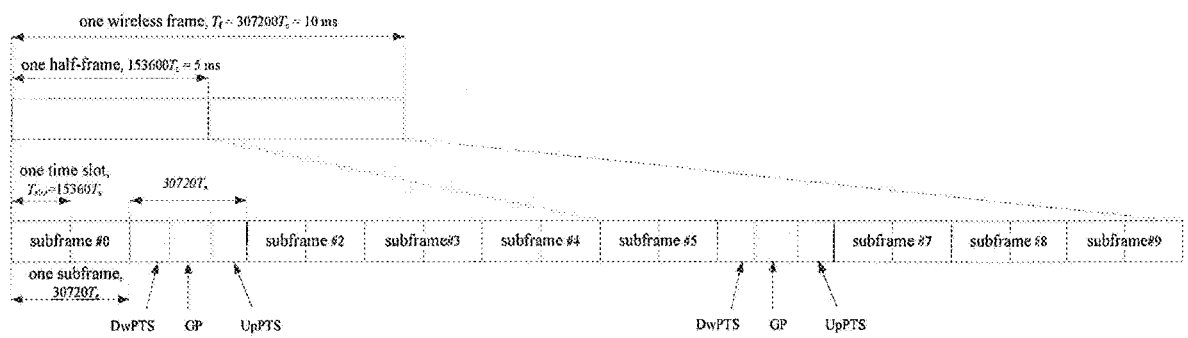
FIG. 2 is a schematic structural diagram of frame structure type 2 utilized in a TDD system in relevant technology.
Figure 3A:
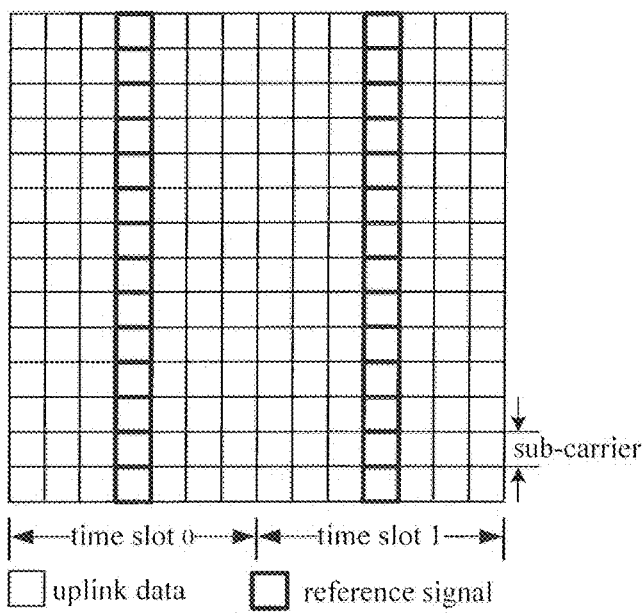
FIG. 3a is a schematic structural diagram of a normal CP pilot of a physical uplink shared channel in relevant technology.
Figure 3B:
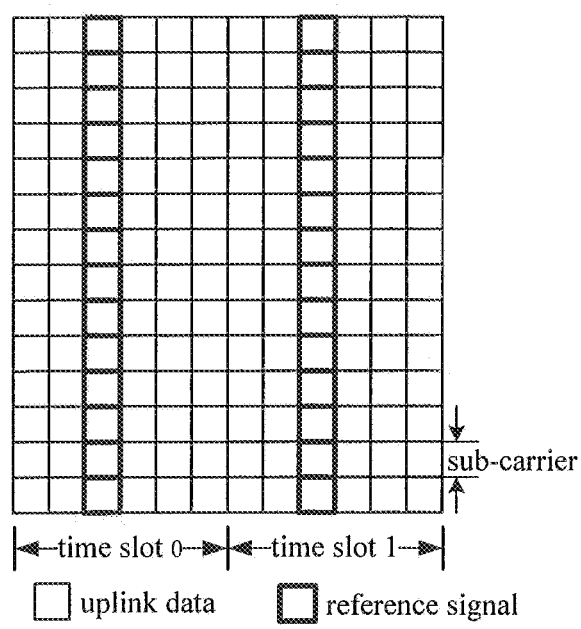
FIG. 3b is a schematic structural diagram of an extended CP pilot of a physical uplink shared channel in relevant technology.
Figure 4:
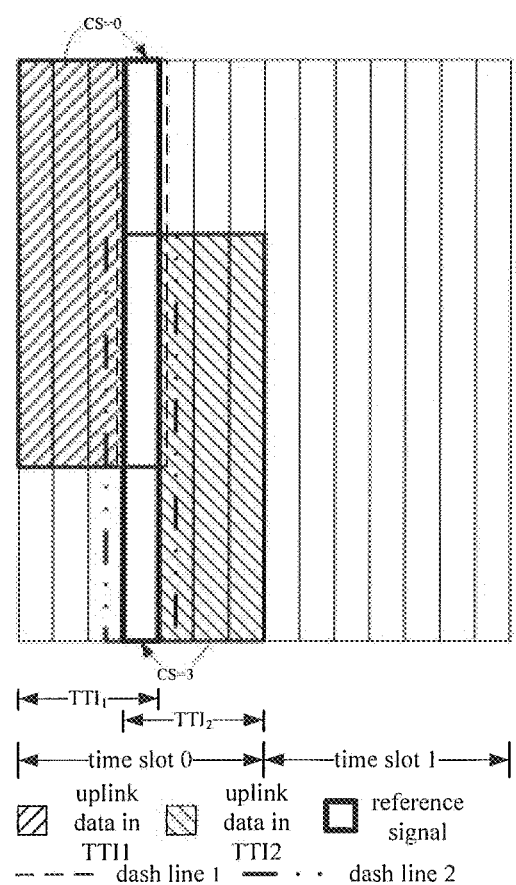
FIG. 4 schematically shows destruction of orthogonality among DMRSs in case of transmitting multiple PUSCHs sharing a DMRS symbol position using a TTI length shorter than 1 ms in the present disclosure.

However, the multiple PUSCHs have independent scheduling information and scheduled bandwidths may merely partially overlap. If DMRS sequences are generated based on corresponding scheduled bandwidths and corresponding DMRS cyclic shift (CS) according to definitions in relevant technical mechanism, the DMRS sequences, when being mapped to the identical symbol, are not aligned because the scheduled bandwidths partially overlap, which may interrupt orthogonality of the DMRS sequences corresponding to different PUSCHs and mapped to an identical frequency domain resource. As shown in FIG. 4, DMRSs that are transmitted in blocks of dash line 1 and dash line 2 and correspond to TTI1 and TTI2 respectively overlap each other only on partial frequency domain resources; hence, the orthogonality of DMRSs is interrupted and a base station cannot distinguish the DMRS of TTI1 from the DMRS of TTI2. In view of the above, new approaches for generating and mapping the DMRS need to be defined in order to ensure the orthogonality of DMRSs corresponding to different data transmissions.

The present disclosure provides the following technical solution to solve the problem that there is no specific approach for data transmission in case of shortened TTI and transmitted data may not be demodulated correctly.

Figure 5:
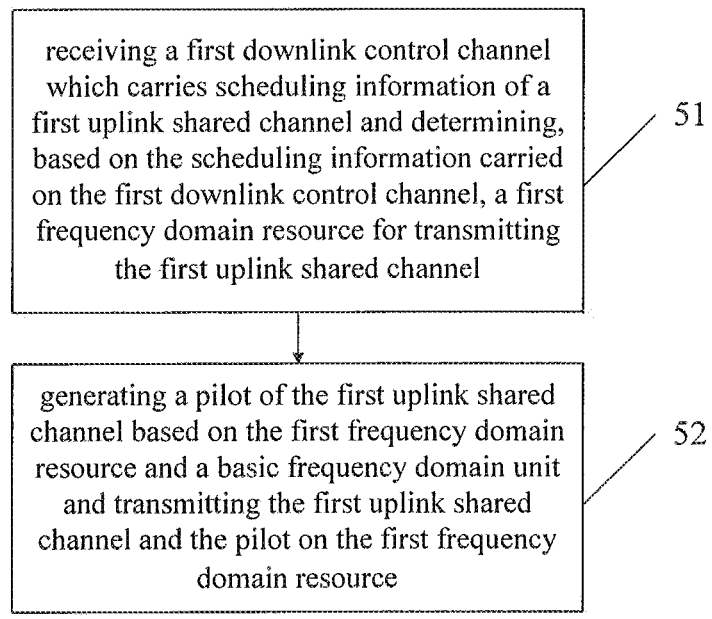
FIG. 5 is a flow chart of an uplink transmission method according to some embodiments of the present disclosure.

As shown in FIG. 5, the present disclosure provides, in some embodiments, an uplink transmission method, which is applied to a terminal. The uplink transmission method includes steps 51 and 52.

Step 51 includes receiving a first downlink control channel which carries scheduling information of a first uplink shared channel and determining, based on the scheduling information carried on the first downlink control channel, a first frequency domain resource for transmitting the first uplink shared channel.

Step 52 includes generating a pilot of the first uplink shared channel based on the first frequency domain resource and a basic frequency domain unit and transmitting the first uplink shared channel and the pilot on the first frequency domain resource.

The basic frequency domain unit is predefined or preconfigured. The first downlink control channel is used to carry an uplink scheduling permission for the first uplink shared channel. A TTI length of the first downlink control channel and/or the first uplink shared channel may be shorter than 1 ms.

Specifically, the basic frequency domain unit is M resource blocks/sub-carriers/resource units in a systematic uplink transmission bandwidth. M is a predefined or pre-configured positive integer that is larger than or equal to 1. The resource unit is one predefined sub-carrier on one symbol or X2 continuous sub-carriers on one symbol, where X2 is a positive integer larger than 0.

The M resource blocks/sub-carriers/resource units are continuous or discontinuous in frequency domain.

Optionally, the processes of generating the pilot of the first uplink shared channel based on the first frequency domain resource and the basic frequency domain unit and transmitting the pilot on the first frequency domain, resource include:

generating a basic pilot for each basic frequency domain unit in the first frequency domain resource independently according to a pilot length corresponding to the each basic frequency domain unit, performing a cyclic shift on the basic pilot corresponding to the each basic frequency domain unit in the first frequency domain resource to obtain a pilot corresponding to the each basic frequency domain unit in the first frequency domain resource, and mapping the pilot to the each basic frequency domain unit in the first frequency domain resource for transmission; or generating a basic pilot according to a pilot length corresponding to the basic frequency domain unit, performing a cyclic shift on the basic pilot, and mapping a result after the cyclic shift to each basic frequency domain unit in the first frequency domain resource for transmission; where in a case that the first frequency domain resource includes multiple basic frequency domain units, pilot lengths corresponding to the multiple basic frequency domain units are identical, cyclic shift values corresponding to the multiple basic frequency domain units are identical or different.

In consideration of actual transmission needs, a size of the first frequency domain resource is an integral multiple of the basic frequency domain unit; and/or, the first frequency domain resource is defined in unit of the basic frequency domain unit (that is, the first frequency domain resource is N basic frequency domain units in a system).

The basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Specifically, the process of generating the basic pilot according to the pilot length corresponding to the basic frequency domain unit includes: generating the basic pilot corresponding to the basic frequency domain unit using one or any combination of a Gold sequence, a pseudorandom sequence and an m sequence.

The process of generating the basic pilot for each basic frequency domain unit in the first frequency domain resource independently according to the pilot length corresponding to the each basic frequency domain unit and the process of generating the basic pilot according to the pilot length corresponding to the basic frequency domain unit both include: generating the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

In view of the above, in the uplink transmission method provided in some embodiments of the present disclosure, DMRSs are generated segmentally on the scheduled frequency domain resource based on the basic frequency domain units. In this way, in each basic frequency domain unit, DMRSs of different uplink (UL) TTIs are orthogonal, and it is ensured that uplink data can be correctly transmitted and demodulated.

Figure 6:
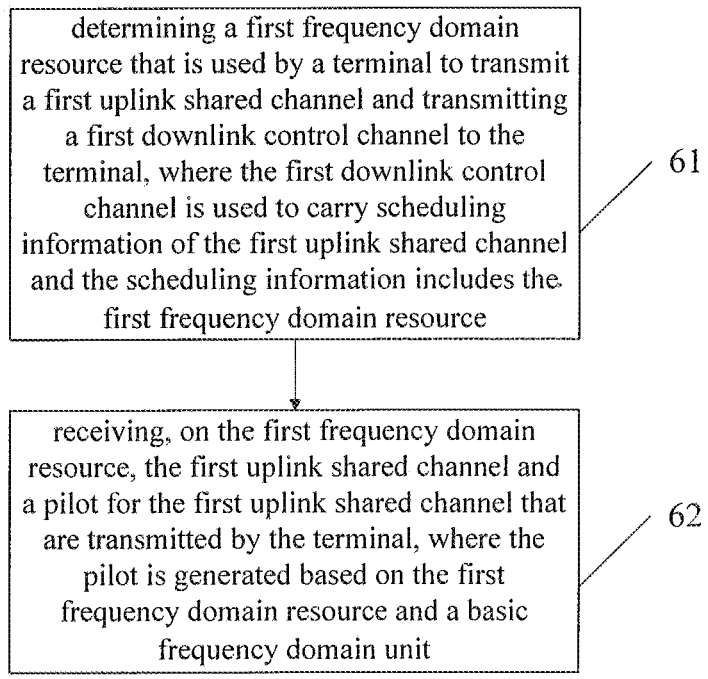
FIG. 6 is a flow chart of an uplink transmission method according to some embodiments of the present disclosure.

For better describing the above uplink transmission method, the present disclosure describes an uplink transmission method on a base station side. Specifically, as shown in FIG. 6, the uplink transmission method includes steps 61 and 62.

Step 61 includes determining a first frequency domain resource that is used by a terminal to transmit a first uplink shared channel and transmitting a first downlink control channel to the terminal, where the first downlink control channel is used to carry scheduling information of the first uplink shared channel and the scheduling information includes the first frequency domain resource.

Step 62 includes: receiving, on the first frequency domain resource, the first uplink shared channel and a pilot for the first uplink shared channel that are transmitted by the terminal, where the pilot is generated based on the first frequency domain resource and a basic frequency domain unit.

The basic frequency domain unit is predefined or pre-configured. The first downlink control channel is used to carry an uplink scheduling permission for the first uplink shared channel. A TTI length of the first downlink control channel and/or the first uplink shared channel may be shorter than 1 ms.

Specifically, the basic frequency domain unit is M resource blocks/sub-carriers/resource units in a systematic uplink transmission bandwidth, M is a predefined or pre-configured positive integer that is larger than or equal to 1. The resource unit is one predefined sub-carrier on one symbol or X2 continuous sub-carriers on one symbol, where X2 is a positive integer larger than 0.

The M resource blocks/sub-carriers/resource units are continuous or discontinuous in frequency domain.

Optionally, a process of generating the pilot based on the first frequency domain resource and the basic frequency domain unit may include determining that the terminal generates the pilot by:

generating a basic pilot for each basic frequency domain unit n the first frequency domain resource independently according to a pilot length corresponding to the each basic frequency domain unit and performing a cyclic shift on the basic pilot corresponding to the each basic frequency domain unit in the first frequency domain resource to obtain a pilot corresponding to the each basic frequency domain unit in the first frequency domain resource; or generating a basic pilot according to a pilot length corresponding to the basic frequency domain unit and performing a cyclic shift on the basic pilot to obtain a pilot corresponding to each basic frequency domain unit in the first frequency domain resource; where in a case that the first frequency domain resource includes multiple basic frequency domain units, pilot lengths corresponding to the multiple basic frequency domain units are identical, cyclic shift values corresponding to the multiple basic frequency domain units are identical or different.

In consideration of actual transmission needs, a size of the first frequency domain resource is an integral multiple of the basic frequency domain unit; and/or, the first frequency domain resource is defined in unit of the basic frequency domain unit (that is, the first frequency domain resource is N basic frequency domain units in a system).

The basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Specifically, the process of generating the basic pilot according to the pilot length corresponding to the basic frequency domain unit includes: generating the basic pilot corresponding to the basic frequency domain unit using one or any combination of a Gold sequence, a pseudorandom sequence and an m sequence.

That is, the process of generating the basic pilot for each basic frequency domain unit in the first frequency domain resource independently according to the pilot length corresponding to the each basic frequency domain unit and the process of generating the basic pilot according to the pilot length corresponding to the basic frequency domain unit both include: generating the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

In view of the above, in the uplink transmission method provided in some embodiments of the present disclosure, a short DMRS sequence is generated based on the basic frequency domain unit. In this way, it is ensured that DMRSs of multiple terminals in the basic frequency domain unit are orthogonal, orthogonal transmissions of DMRSs of multiple first uplink shared channels using different frequency domain resources for data transmission but sharing an identical DMRS resource can be ensured when a transmission bandwidth changes, and it is further ensured that uplink data can be correctly transmitted and demodulated.

The uplink transmission method in the present disclosure is to be described in conjunction with a specific example.

First it should be noted, each resource unit in the present disclosure is defined as one sub-carrier on one symbol, or as X2 REs/SCs on one symbol that are continuous in frequency domain. The resource unit is abbreviated as RU. X2 is a positive integer larger than 0.

Figure 7:
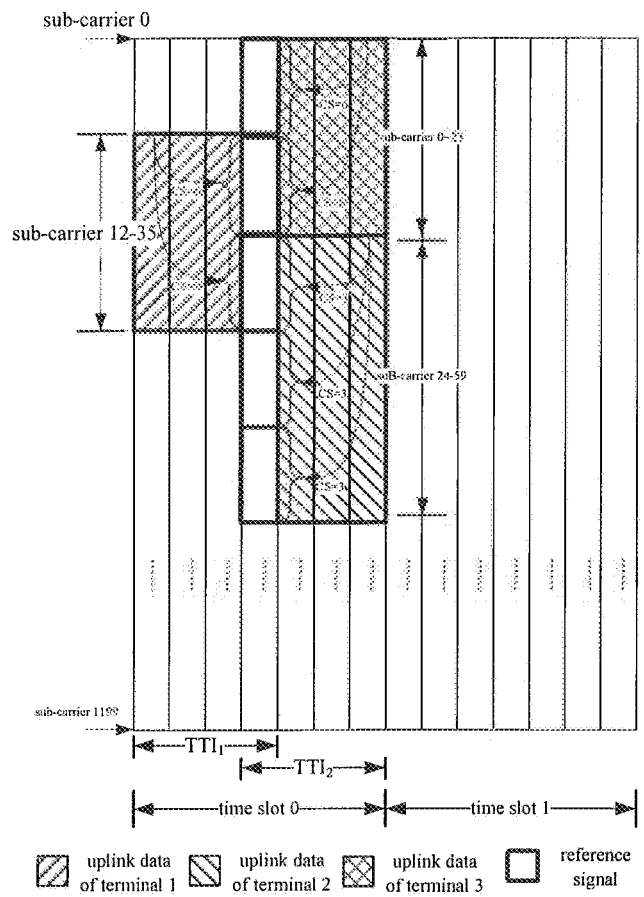
FIG. 7 is a flow chart of a specific uplink transmission application according to some embodiments of the present disclosure.

As shown in FIG. 7, exemplarily, two TTIs each having a length of 4 symbols share one column of DMRSs and a systematic uplink bandwidth is 20 MHz. It is assumed that the systematic uplink bandwidth includes 100 PRBs, serial numbers of sub-carriers are from 0 to 999 or serial numbers of RUs are from 0 to 99. Here and in the following, RU is taken as a unit, each RU is supposed to have 12 SCs and it is defined from a smallest SC, and the RUs begins from RU0.

It is suggested that the basic frequency domain unit of UL DMRS is 12 continuous SCs on one symbol or one RU. A frequency domain resource (i.e., the first frequency domain resource) occupied by a data transmission indicated by a scheduling signaling of terminal 1 is sub-carriers 12 to 35 or RU1 to RU2, and a cyclic shift value CS of the DMRS of terminal 1 is determined to be 0 based on cyclic shift information indicated by scheduling information of terminal 1. A frequency domain resource occupied by a data transmission indicated by a scheduling signaling of terminal 2 is sub-carriers 24 to 59 or RU2 to RU4, and a cyclic shift value CS of the DMRS of terminal 2 is determined to be 3 based on cyclic shift information indicated by scheduling information of terminal 2. A frequency domain resource occupied by a data transmission indicated by a scheduling signaling of terminal 3 is sub-carriers 0 to 23 or RU0 to RU1, and a cyclic shift value CS of the DMRS of terminal 3 is determined to be 6 based on cyclic shift information indicated by scheduling information of terminal 3.

Terminal 1 transmits its data information and DMRS on sub-carriers 12 to 35 or RU1 to RU2. A length of a DMRS base sequence for terminal 1 is one basic frequency domain unit, i.e., 12 SCs. Terminal 1 generates the DMRS base sequence having a length of 12 using a pseudorandom sequence and performs a cyclic shift whose CS is 0 on the base sequence. Then, a DMRS sequence after the cyclic shift having a length of 12 is repeatedly mapped by terminal 1 to basic frequency domain units included in the scheduled frequency domain resource for terminal 1. That is, the sequence is repeated to obtain two identical sequence and the two identical sequence are mapped to sub-carriers 12 to 35 or RU1 to RU2 respectively.

Terminal 2 transmits its data information and DMRS on sub-carriers 24 to 59 or RU2 to RU4. A length of a DMRS base sequence for terminal 2 is one basic frequency domain unit, i.e., 12 SCs. Terminal 2 generates the DMRS base sequence having a length of 12 using a pseudorandom sequence and performs a cyclic shift whose CS is 3 on the base sequence. Then, a DMRS sequence after the cyclic shift having a length of 12 is repeatedly mapped by terminal 2 to basic frequency domain units included in the scheduled frequency domain resource for terminal 2. That is, the sequence is repeated to obtain three identical sequence and the three identical sequence are mapped to sub-carriers 24 to 59 or RU2 to RU4 respectively.

Terminal 3 transmits its data information and DMRS on sub-carriers 0 to 23 or RU0 to RU1. A length of a DMRS base sequence for terminal 3 is one basic frequency domain unit, i.e., 12 SCs. Terminal 3 generates the DMRS base sequence having a length of 12 using a pseudorandom sequence and performs a cyclic shift whose CS is 6 on the base sequence. Then, a DMRS sequence after the cyclic shift having a length of 12 is repeatedly mapped by terminal 3 to basic frequency domain units included in the scheduled frequency domain resource for terminal 3. That is, the sequence is repeated to obtain two identical sequence and the two identical sequence are mapped to sub-carriers 0 to 23 or RU0 to RU1 respectively.

In the above specific applications, DMRS sequences corresponding to multiple basic frequency domain units included in a frequency domain resource allocated for one terminal may use different CSs. For example, a CS changing manner is appointed: it is supposed that for a first basic frequency domain unit, the cyclic shift is performed using CS_init that is determined based on an indication of the scheduling signaling; a cyclic shift value for a second basic frequency domain unit is obtained on the basis of CS_init, e.g., obtained by adding a certain offset to C_init (the offset may be preset or pre-configured), or a CS_init-related variable function is defined. By the above analogies, DMRS cyclic shift value corresponding to each basic frequency domain unit of the multiple basic frequency domain units included in the frequency domain resource allocated to the terminal are obtained; then, DMRS sequences corresponding to different basic frequency domain units are obtained by performing cyclic shifts on an identical DMRS base sequence using different cyclic shift values. In the method, when scheduling terminals sharing the same DMRS resource through the scheduling signaling, cyclic shift values corresponding to DMRSs or different services on the same basic frequency domain unit need to be different to ensure orthogonality.

In conclusion, in the solution provided in the present disclosure, the DMRSs are generated based on basic frequency domain, when different UL TTIs an identical symbol position as the DMRSs, terminals working in different UL TTIs generate the DMRSs segmentally based on the basic frequency domain units in the scheduled frequency domain resources for the terminals, such that DMRSs of different UL TTIs in each basic frequency domain unit are orthogonal.

That is to say, in the solution of the present disclosure, a short DMRS sequence is generated based on the basic frequency domain unit. In this way, it is ensured that DMRSs of multiple terminals in the basic frequency domain unit are orthogonal, orthogonal transmissions of DMRSs of multiple first uplink shared channels using different frequency domain resources for data transmission but sharing an identical DMRS resource can be ensured when a transmission bandwidth changes, and it is further ensured that uplink data can be correctly transmitted and demodulated.

Figure 8:
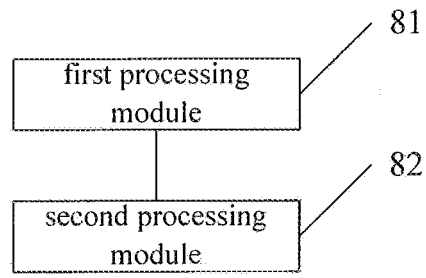
FIG. 8 is a schematic structural diagram of an uplink transmission device according to some embodiments of the present disclosure.

As shown in FIG. 8, the present disclosure provides, in some embodiments, an uplink transmission device which is applied to a terminal. The uplink transmission device includes a first processing module 81 and a second processing module 82.

The first processing module 81 is arranged to receive a first downlink control channel which carries scheduling information of a first uplink shared channel and determine, based on the scheduling information carried on the first downlink control channel, a first frequency domain resource for transmitting the first uplink shared channel.

The second processing module 82 is arranged to generate a pilot of the first uplink shared channel based on the first frequency domain resource and a basic frequency domain unit and transmit the first uplink shared channel and the pilot on the first frequency domain resource.

The basic frequency domain unit is predefined or pre-configured. The first downlink control channel is used to carry an uplink scheduling permission for the first uplink shared channel. A TTI length of the first downlink control channel and/or the first uplink shared channel may be shorter than 1 ms.

Specifically, the basic frequency domain unit is M resource blocks/sub-carriers/resource units in a systematic uplink transmission bandwidth. M is a predefined or pre-configured positive integer that is larger than or equal to 1. The resource unit is one predefined sub-carrier on one symbol or X2 continuous sub-carriers on one symbol, where X2 is a positive integer larger than 0.

The M resource blocks/sub-carriers/resource units are continuous or discontinuous in frequency domain.

Optionally, the second processing module includes:

a first processing sub-module arranged to generate a basic pilot for each basic frequency domain unit in the first frequency domain resource independently according to a pilot length corresponding to the each basic frequency domain unit, perform a cyclic shift on the basic pilot corresponding to the each basic frequency domain unit in the first frequency domain resource to obtain a pilot corresponding to the each basic frequency domain unit in the first frequency domain resource, and map the pilot to the each basic frequency domain unit in the first frequency domain resource for transmission; or a second processing sub-module arranged to generate a basic pilot according to a pilot length corresponding to the basic frequency domain unit, perform a cyclic shift on the basic pilot, and map a result after the cyclic shift to each basic frequency domain unit in the first frequency domain resource for transmission.

In a case that the first frequency domain resource includes multiple basic frequency domain units, pilot lengths corresponding to the multiple basic frequency domain units are identical, cyclic shift values corresponding to the multiple basic frequency domain units are identical or different.

In consideration of actual transmission needs, a size of the first frequency domain resource is an integral multiple of the basic frequency domain unit; and/or, the first frequency domain resource is defined in unit of the basic frequency domain unit (that is, the first frequency domain resource is N basic frequency domain units in a system).

The basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Specifically, both the first processing sub-module and the second processing sub-module include a first generating unit, arranged to generate the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

In view of the above, in the uplink transmission device provided in some embodiments of the present disclosure, DMRSs are generated segmentally on the scheduled frequency domain resource based on the basic frequency domain units. In this way, in each basic frequency domain unit, DMRSs of different uplink (UL) TTIs are orthogonal, and it is ensured that uplink data can be correctly transmitted and demodulated.

It should be noted, the uplink transmission device according to some embodiments of the present disclosure is an uplink transmission device corresponding to the uplink transmission method according to some embodiments of the present disclosure. Hence, all implementations of the uplink transmission method can be applied to the uplink transmission device and same or similar beneficial effects can be achieved.

For better achieving the objective, the present disclosure provides, in some embodiments, an uplink transmission device, including a processor and a storage connected to the processor via a bus interface. The storage is arranged to store a program and data used by the processor in operation. The processor, when calling and executing the program and data stored in the storage, implement the following functional modules:

a first processing module, arranged to receive a first downlink control channel which carries scheduling information of a first uplink shared channel and determine, based on the scheduling information carried on the first downlink control channel, a first frequency domain resource for transmitting the first uplink shared channel; and a second processing module, arranged to generate a pilot of the first uplink shared channel based on the first frequency domain resource and a basic frequency domain unit and transmit the first uplink shared channel and the pilot on the first frequency domain resource.

It should be noted, the uplink transmission device according to some embodiments of the present disclosure is an uplink transmission device corresponding to the uplink transmission method according to some embodiments of the present disclosure. Hence, all implementations of the uplink transmission method can be applied to the uplink transmission device and same or similar beneficial effects can be achieved.

Figure 9:
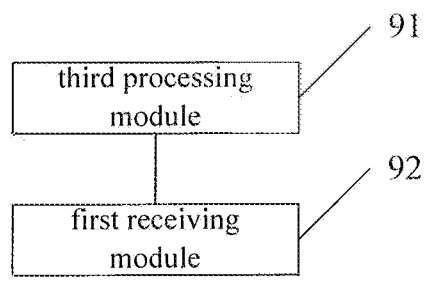
FIG. 9 is a schematic structural diagram of an uplink transmission device according to some embodiments of the present disclosure.

For better achieving the objective, the present disclosure provides, in some embodiments, an uplink transmission device. As shown in FIG. 9, the uplink transmission device includes:

a third processing module 91, arranged to determine a first frequency domain resource that is used by a terminal to transmit a first uplink shared channel and transmit a first downlink control channel to the terminal, where the first downlink control channel is used to carry scheduling information of the first uplink shared channel and the scheduling information includes the first frequency domain resource; and a first receiving module 92, arranged to receive, on the first frequency domain resource, the first uplink shared channel and a pilot for the first uplink shared channel that are transmitted by the terminal, where the pilot is generated based on the first frequency domain resource and a basic frequency domain unit.

The basic frequency domain unit is predefined or preconfigured. The first downlink control channel is used to carry an uplink scheduling permission for the first uplink shared channel. A TTI length of the first downlink control channel and/or the first uplink shared channel may be shorter than 1 ms.

Specifically, the basic frequency domain unit is M resource blocks/sub-carriers/resource units in a systematic uplink transmission bandwidth. M is a predefined or preconfigured positive integer that is larger than or equal to 1. The resource unit is one predefined sub-carrier on one symbol or X2 continuous sub-carriers on one symbol, where X2 is a positive integer larger than 0.

The M resource blocks/sub-carriers/resource units are continuous or discontinuous in frequency domain.

Optionally, the pilot is generated based on the first frequency domain resource and the basic frequency domain unit. Specifically, the uplink transmission device includes a first determining module, arranged to determine that the terminal generates the pilot by the following processes:

generating a basic pilot for each basic frequency domain unit in the first frequency domain resource independently according to a pilot length corresponding to the each basic frequency domain unit and performing a cyclic shift on the basic pilot corresponding to the each basic frequency domain unit in the first frequency domain resource to obtain a pilot corresponding to the each basic frequency domain unit in the first frequency domain resource; or generating a basic pilot according to a pilot length corresponding to the basic frequency domain unit and performing a cyclic shift on the basic pilot to obtain a pilot corresponding to each basic frequency domain unit in the first frequency domain resource.

In a case that the first frequency domain resource includes multiple basic frequency domain units, pilot lengths corresponding to the multiple basic frequency domain units are identical, cyclic shift values corresponding to the multiple basic frequency domain units are identical or different.

In consideration of actual transmission needs, a size of the first frequency domain resource is an integral multiple of the basic frequency domain unit; and/or, the first frequency domain resource is defined in unit of the basic frequency domain unit (that is, the first frequency domain resource is N basic frequency domain units in a system).

The basic pilots corresponding to multiple first uplink shared channels sharing an identical symbol position for pilot transmission are identical; and/or, multiple first uplink shared channels simultaneously transmitting pilots on an identical basic frequency domain unit have the same basic pilot on the basic frequency domain unit and different cyclic shift values.

Specifically, the process of generating the basic pilot according to the pilot length corresponding to the basic frequency domain unit includes: generating the basic pilot corresponding to the basic frequency domain unit using one or any combination of a Gold sequence, a pseudorandom sequence and an m sequence.

That is, the process of generating the basic pilot for each basic frequency domain unit in the first frequency domain resource independently according to the pilot length corresponding to the each basic frequency domain unit and the process of generating the basic pilot according to the pilot length corresponding to the basic frequency domain unit both include: generating the basic pilot corresponding to the basic frequency domain unit using one or any combination of a Gold sequence, a pseudorandom sequence and an m sequence.

Optionally, the cyclic shift value is determined according to a preset rule, or according to an indication of a high layer signaling, or according to an indication field in the first downlink control channel.

In view of the above, in the uplink transmission device provided in some embodiments of the present disclosure, a short DMRS sequence is generated based on the basic frequency domain unit. In this way, it is ensured that DMRSs of multiple terminals in the basic frequency domain unit are orthogonal, orthogonal transmissions of DMRSs of multiple first uplink shared channels using different frequency domain resources for data transmission but sharing an identical DMRS resource can be ensured when a transmission bandwidth changes, and it is further ensured that uplink data can be correctly transmitted and demodulated.

It should be noted, the uplink transmission device according to some embodiments of the present disclosure is an uplink transmission device corresponding to the uplink transmission method according to some embodiments of the present disclosure. Hence, all implementations of the uplink transmission method can be applied to the uplink transmission device and same or similar beneficial effects can be achieved.

For better achieving the objective, the present disclosure provides, in some embodiments, an uplink transmission device, including a processor and a storage connected to the processor via a bus interface. The storage is arranged to store a program and data used by the processor in operation. The processor, when calling and executing the program and data stored in the storage, implement the following functional modules:

a third processing module, arranged to determine a first frequency domain resource that is used by a terminal to transmit a first uplink shared channel and transmit a first downlink control channel to the terminal, where the first downlink control channel is used to carry scheduling information of the first uplink shared channel and the scheduling information includes the first frequency domain resource; and a first receiving module, arranged to receive, on the first frequency domain resource, the first uplink shared channel and a pilot for the first uplink shared channel that are transmitted by the terminal, where the pilot is generated based on the first frequency domain resource and a basic frequency domain unit.

It should be noted, the uplink transmission device according to some embodiments of the present disclosure is an uplink transmission device corresponding to the uplink transmission method according to some embodiments of the present disclosure. Hence, all implementations of the uplink transmission method can be applied to the uplink transmission device and same or similar beneficial effects can be achieved.

In the specification, many functional parts in the description are called as modules or sub-modules, in order to strengthen their independent implementing ways.

In the embodiments of the present disclosure, the modules/sub-modules may be implemented through software to be conveniently executed by various kinds of processors. For example, an identified executable code module may include one or multiple physical or logic blocks instructed by a computer and may be constructed into, e.g., an object, a process or a function. Even so, executable codes for the identified module need not locate together physically, instead they may include different instructions stored at different locations, and these instructions may be combined to form the module and achieve a specified objective of the module.

Indeed, the executable code module may be a single instruction or multiple instructions, and it may even be distributed in different code segments, or distributed in different programs, or distributed across multiple storage devices. In addition, operation data may be recognized in the module, achieved in any proper form and organized in a data structure of any proper type. The operation data may be gathered as a single data set, or may be distributed at different locations (e.g., in different storage devices), or at least some of the operation data may exist in a system or a network in form of an electronic signal.

If the module can be implemented through software, considering hardware manufacturing level in relevant technology, the module can be implemented through software. In case of not considering the cost, a corresponding hardware circuit may be constructed by those skilled in the art to implement a corresponding function. The hardware circuit includes a common very-large-scale integrated (VLSI) circuit, a gate array, or a semiconductor such as a logic chip and a transistor and other independent components in relevant technology. The module can be implemented through a programmable hardware device such as a field-programmable gate array, a programmable array logic or a programmable logic device.

The present disclosure is described in reference to flow charts and/or block diagrams of methods, devices (systems) and computer program products according to some embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely some embodiments of the present disclosure. It should be noted that, a person skilled in the art may make various improvements and modifications without departing from the principle of the present disclosure, and these improvements and modifications shall also fall within the scope of the present disclosure.

What is claimed is:

1. An uplink transmission method, comprising:
receiving a first downlink control channel which carries scheduling information of a first uplink shared channel on one serving cell and determining, based on the scheduling information carried on the first downlink control channel, a first frequency domain resource for transmitting the first uplink shared channel; wherein the first frequency domain resource includes multiple basic frequency domain units, and the basic frequency domain unit includes at least one of M resource blocks, M sub-carriers or M resource units in a system uplink transmission bandwidth, M is a positive integer larger than or equal to 1, the resource unit includes one sub-carrier on one symbol or X2 continuous sub-carriers on one symbol, and X2 is a positive integer larger than 1;
generating a pilot of the first uplink shared channel based on the first frequency domain resource and the basic frequency domain unit; and
transmitting the first uplink shared channel and the pilot on the first frequency domain resource;
wherein the generating the pilot of the first uplink shared channel based on the first frequency domain resource and the basic frequency domain unit and transmitting the pilot on the first frequency domain resource comprise:
generating a basic pilot for each of basic frequency domain units included in the first frequency domain resource independently according to a pilot length corresponding to the each basic frequency domain unit, performing a cyclic shift on each basic pilot corresponding to the each basic frequency domain unit in the first frequency domain resource to obtain a pilot corresponding to the each basic frequency domain unit in the first frequency domain resource, and mapping each pilot to the each basic frequency domain unit in the first frequency domain resource for a transmission; or
generating a basic pilot according to a pilot length corresponding to the basic frequency domain unit, performing a cyclic shift on the basic pilot to obtain a pilot, and mapping the obtained pilot to each of the basic frequency domain units included in the first frequency domain resource for a transmission;
wherein pilot lengths corresponding to the multiple basic frequency domain units are identical, and cyclic shift values corresponding to the multiple basic frequency domain units are identical or different.

2. The uplink transmission method according to claim 1, wherein the at least one of M resource blocks, M sub-carriers or M resource units are continuous or discontinuous in a frequency domain.

3. The uplink transmission method according to claim 1, wherein a size of the first frequency domain resource is an integer multiple of the basic frequency domain unit.

4. The uplink transmission method according to claim 1, wherein the uplink transmission method further includes at least one of the following:
basic pilots corresponding to multiple first uplink shared channels sharing an identical symbol position for a pilot transmission are identical;
multiple first uplink shared channels simultaneously transmitting pilots on an identical basic frequency domain unit have the same basic pilot on the basic frequency domain unit and different cyclic shift values;

the generating the basic pilot according to the pilot length corresponding to the basic frequency domain unit comprises: generating the basic pilot corresponding to the basic frequency domain unit using one or any combination of a Gold sequence, a pseudorandom sequence and an m sequence; and the cyclic shift value is determined according to a preset rule, or according to an indication of a high layer signaling, or according to an indication field in the first downlink control channel.

5. An uplink transmission device, comprising a processor, a transceiver and a storage; wherein the processor is configured to read a program stored in the storage to:

receive a first downlink control channel which carries scheduling information of a first uplink shared channel on one serving cell and determine, based on the scheduling information carried on the first downlink control channel, a first frequency domain resource for transmitting the first uplink shared channel; wherein the first frequency domain resource includes multiple basic frequency domain units, and the basic frequency domain unit includes at least one of M resource blocks, M sub-carriers or M resource units in a system uplink transmission bandwidth, M is a positive integer larger than or equal to 1, the resource unit includes one sub-carrier on one symbol or X2 continuous sub-carriers on one symbol, and X2 is a positive integer larger than 1; and generate a pilot of the first uplink shared channel based on the first frequency domain resource and the basic frequency domain unit and transmit the first uplink shared channel and the pilot on the first frequency domain resource;

wherein the processor is further configured to read the program stored in the storage to:

generate a basic pilot for each of the basic frequency domain units included in the first frequency domain resource independently according to a pilot length corresponding to the each basic frequency domain unit, perform a cyclic shift on each basic pilot corresponding to the each basic frequency domain unit in the first frequency domain resource to obtain a pilot corresponding to the each basic frequency domain unit in the first frequency domain resource, and map each pilot to the each basic frequency domain unit in the first frequency domain resource for transmission; or generate a basic pilot according to a pilot length corresponding to the basic frequency domain unit, perform a cyclic shift on the basic pilot to obtain a pilot, and map the obtained pilot to each of the basic frequency domain units included in the first frequency domain resource for transmission;

wherein pilot lengths corresponding to the multiple basic frequency domain units are identical, cyclic shift values corresponding to the multiple basic frequency domain units are identical or different.

6. The uplink transmission device according to claim 5, wherein the at least one of M resource blocks, M sub-carriers or M resource units are continuous or discontinuous in a frequency domain.

7. The uplink transmission device according to claim 5, wherein a size of the first frequency domain resource is an integer multiple of the basic frequency domain unit.

8. The uplink transmission device according to claim 5, wherein the uplink transmission device further includes at least one of the following:

basic pilots corresponding to multiple first uplink shared channels sharing an identical symbol position for a pilot transmission are identical;

multiple first uplink shared channels simultaneously transmitting pilots on an identical basic frequency domain unit have the same basic pilot on the basic frequency domain unit and different cyclic shift values;

the processor is further configured to read the program stored in the storage to generate the basic pilot corresponding to the basic frequency domain unit using one or any combination of a Gold sequence, a pseudorandom sequence and an m sequence;

the cyclic shift value is determined according to a preset rule, or according to an indication of a high layer signaling, or according to an indication field in the first downlink control channel.

9. An uplink transmission method, comprising:

determining a first frequency domain resource used by a terminal to transmit a first uplink shared channel and transmitting a first downlink control channel to the terminal, wherein the first downlink control channel is configured to carry scheduling information of the first uplink shared channel on one serving cell and the scheduling information comprises the first frequency domain resource; wherein the first frequency domain resource includes multiple basic frequency domain units, and the basic frequency domain unit includes at least one of M resource blocks, M sub-carriers or M resource units in a system uplink transmission bandwidth, M is a positive integer larger than or equal to 1, the resource unit includes one sub-carrier on one symbol or X2 continuous sub-carriers on one symbol, and X2 is a positive integer larger than 1; and receiving, on the first frequency domain resource, the first uplink shared channel and a pilot for the first uplink shared channel transmitted by the terminal, wherein the pilot is generated based on the first frequency domain resource and the basic frequency domain unit;

wherein the generating the pilot based on the first frequency domain resource and the basic frequency domain unit comprises determining that the terminal generates the pilot by:

generating a basic pilot for each of basic frequency domain units included in the first frequency domain resource independently according to a pilot length corresponding to the each basic frequency domain unit and performing a cyclic shift on each basic pilot corresponding to the each basic frequency domain unit in the first frequency domain resource to obtain a pilot corresponding to the each basic frequency domain unit in the first frequency domain resource; or generating a basic pilot according to a pilot length corresponding to the basic frequency domain unit, performing a cyclic shift on the basic pilot to obtain a pilot corresponding to the basic frequency domain unit;

wherein pilot lengths corresponding to the multiple basic frequency domain units are identical, cyclic shift values corresponding to the multiple basic frequency domain units are identical or different.

10. The uplink transmission method according to claim 9, wherein the at least one of M resource blocks, M sub-carriers or M resource units are continuous or discontinuous in a frequency domain.

11. The uplink transmission method according to claim 9, wherein a size of the first frequency domain resource is an integer multiple of the basic frequency domain unit.

12. The uplink transmission method according to claim 9, wherein the uplink transmission method further includes at least one of the following:
- basic pilots corresponding to multiple first uplink shared channels sharing an identical symbol position for pilot transmission are identical;
- multiple first uplink shared channels simultaneously transmitting pilots on an identical basic frequency domain unit have the same basic pilot on the basic frequency domain unit and different cyclic shift values;
- the generating the basic pilot according to the pilot length corresponding to the basic frequency domain unit comprises: generating the basic pilot corresponding to the basic frequency domain unit using one or any combination of a Gold sequence, a pseudorandom sequence and an m sequence;
- the cyclic shift value is determined according to a preset rule, or according to an indication of a high layer signaling, or according to an indication field in the first downlink control channel.

13. An uplink transmission device, comprising:
a processor,
a transceiver and
a storage;
wherein the processor is configured to read a program stored in the storage to:
determine a first frequency domain resource used by a terminal to transmit a first uplink shared channel and transmit a first downlink control channel to the terminal, wherein the first downlink control channel is configured to carry scheduling information of the first uplink shared channel on one serving cell and the scheduling information comprises the first frequency domain resource; wherein the first frequency domain resource includes multiple basic frequency domain units, and the basic frequency domain unit includes at least one of M resource blocks, M sub-carriers or M resource units in a system uplink transmission bandwidth, M is a positive integer larger than or equal to 1, the resource unit includes one sub-carrier on one symbol or X2 continuous sub-carriers on one symbol, and X2 is a positive integer larger than 1; and
receive, on the first frequency domain resource, the first uplink shared channel and a pilot for the first uplink shared channel transmitted by the terminal, wherein the pilot is generated based on the first frequency domain resource and the basic frequency domain unit;
wherein the pilot is generated based on the first frequency domain resource and the basic frequency domain unit and the processor is further configured to read the program stored in the storage to:
generate a basic pilot for each of basic frequency domain units included in the first frequency domain resource independently according to a pilot length corresponding to the each basic frequency domain unit and perform a cyclic shift on each basic pilot corresponding to the each basic frequency domain unit in the first frequency domain resource to obtain a pilot corresponding to the each basic frequency domain unit in the first frequency domain resource; or
generate a basic pilot according to a pilot length corresponding to the basic frequency domain unit, perform a cyclic shift on the basic pilot to obtain a pilot corresponding to the basic frequency domain unit;
wherein pilot lengths corresponding to the multiple basic frequency domain units are identical, cyclic shift values corresponding to the multiple basic frequency domain units are identical or different.

14. The uplink transmission device according to claim 13, wherein
the at least one of M resource blocks, M sub-carriers or M resource units are continuous or discontinuous in a frequency domain.

15. The uplink transmission device according to claim 13, wherein a size of the first frequency domain resource is an integer multiple of the basic frequency domain unit.

16. The uplink transmission device according to claim 13, wherein the uplink transmission device further includes at least one of the following:
- basic pilots corresponding to multiple first uplink shared channels sharing an identical symbol position for a pilot transmission are identical;
- multiple first uplink shared channels simultaneously transmitting pilots on an identical basic frequency domain unit have the same basic pilot on the basic frequency domain unit and different cyclic shift values;
- the processor is further configured to read a program stored in the storage to generate the basic pilot corresponding to the basic frequency domain unit using one or any combination of a Gold sequence, a pseudorandom sequence and an m sequence;
- the cyclic shift value is determined according to a preset rule, or according to an indication of a high layer signaling, or according to an indication field in the first downlink control channel.

17. The uplink transmission method according to claim 1, wherein a length of the basic pilot is equal to a length of each basic frequency domain unit; and a length of the pilot corresponding to each basic frequency domain unit is equal to the length of each basic frequency domain unit.

18. The uplink transmission device according to claim 5, wherein a length of the basic pilot is equal to a length of each basic frequency domain unit; and a length of the pilot corresponding to each basic frequency domain unit is equal to the length of each basic frequency domain unit.

19. The uplink transmission method according to claim 9, wherein a length of the basic pilot is equal to a length of each basic frequency domain unit; and a length of the pilot corresponding to each basic frequency domain unit is equal to the length of each basic frequency domain unit.

20. The uplink transmission device according to claim 13, wherein a length of the basic pilot is equal to a length of each basic frequency domain unit; and a length of the pilot corresponding to each basic frequency domain unit is equal to the length of each basic frequency domain unit.

* * * * *